United States Patent [19]

Geus

[11] Patent Number: 4,691,272
[45] Date of Patent: Sep. 1, 1987

[54] INVERSE RECTIFIER

[75] Inventor: Georg Geus, Wiesbaden, Fed. Rep. of Germany

[73] Assignee: Heimann GmbH, Fed. Rep. of Germany

[21] Appl. No.: 802,257

[22] Filed: Nov. 27, 1985

[30] Foreign Application Priority Data

Jan. 25, 1985 [DE] Fed. Rep. of Germany ....... 3502492

[51] Int. Cl.⁴ .................... H02M 7/515; H05G 1/20
[52] U.S. Cl. ...................................... 363/98; 363/132; 378/105
[58] Field of Search ............... 363/56, 98, 53, 131, 363/132, 138; 378/101, 104, 106, 105

[56] References Cited

U.S. PATENT DOCUMENTS

| | | | |
|---|---|---|---|
| 4,170,734 | 10/1979 | Woodruff | 250/402 |
| 4,184,075 | 1/1980 | Ebersberger | 250/402 |
| 4,200,897 | 4/1980 | Dawley | 361/110 |
| 4,301,496 | 11/1981 | Schwarz | 363/17 |
| 4,429,347 | 1/1984 | Seitz | 363/141 |

FOREIGN PATENT DOCUMENTS

| | | |
|---|---|---|
| 0047957 | 3/1982 | European Pat. Off. . |
| 0102532 | 3/1984 | European Pat. Off. . |
| 0108336 | 5/1984 | European Pat. Off. . |
| 3415011 | 10/1984 | Fed. Rep. of Germany ........ 363/56 |
| 2408970 | 6/1979 | France . |
| 625369 | 9/1981 | Switzerland ........................ 363/138 |
| 978293 | 11/1982 | U.S.S.R. ................................. 363/20 |

Primary Examiner—Patrick R. Salce
Assistant Examiner—Judson H. Jones
Attorney, Agent, or Firm—Hill, Van Santen, Steadman & Simpson

[57] ABSTRACT

An inverse rectifier for use with a high voltage transformer of an x-ray generator has an air-core coil disposed between the load output and two switching transistors in a half-bridge circuit. The junctions of the air-core coils with the switching transistors are cross-connected to a constant voltage source through respective diodes which block the constant voltage. An RC element is connected in parallel with each air-core coil.

2 Claims, 1 Drawing Figure

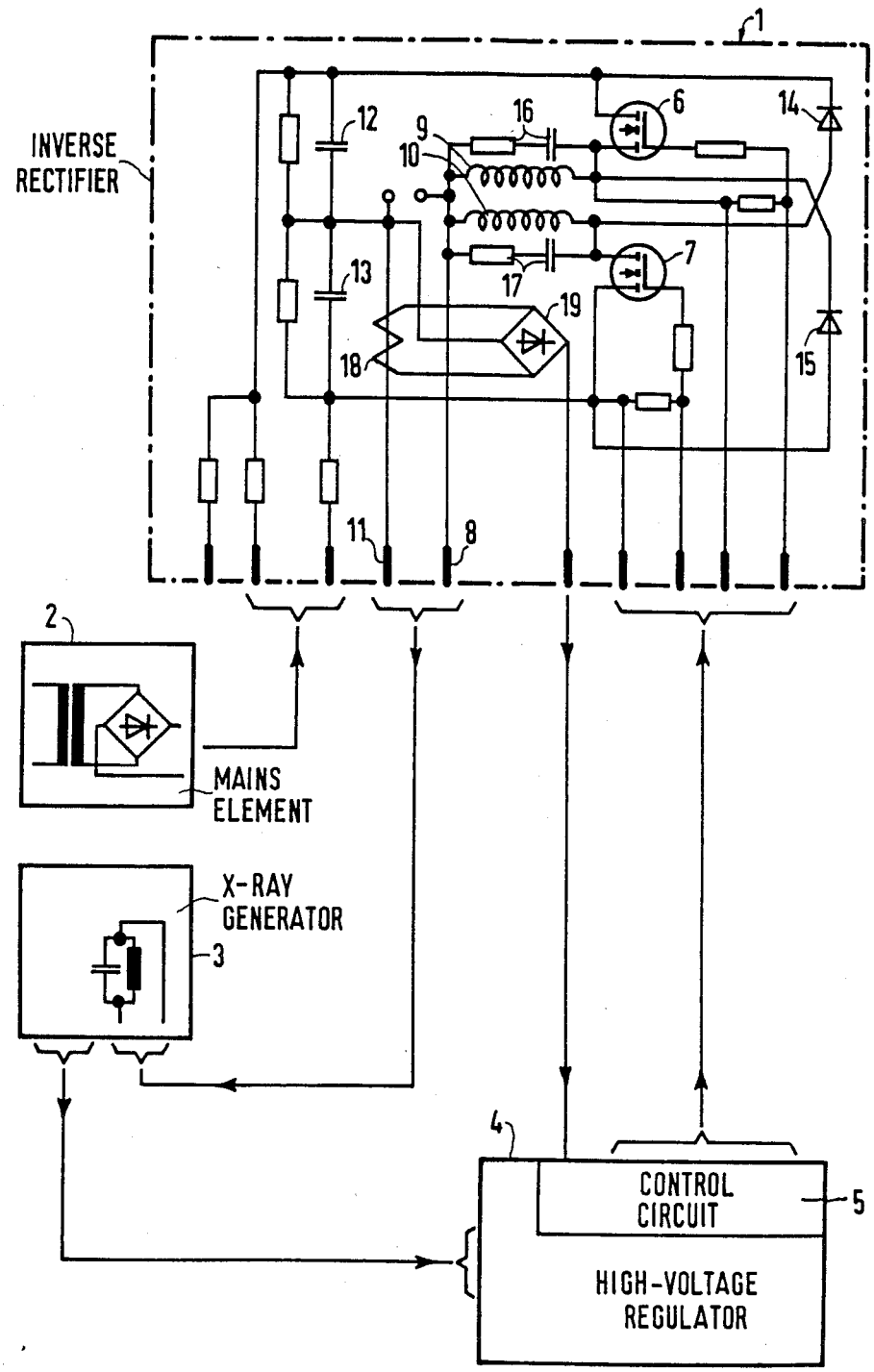

4,691,272

INVERSE RECTIFIER

BACKGROUND OF THE INVENTION

1. Field of the Invention

The present invention relates to an inverse rectifier for use with a high voltage transformer in an x-ray generator, and in particular to such a rectifier having two switching transistors which alternately connect a load output to be positive and negative poles of a constant voltage source.

2. Description of the Prior Art

An inverse rectifier having two switching transistors which alternately connect a load output to either the positive pole or the negative pole of a constant voltage source is described in German No. OS 27 50 455. This inverse rectifier forms a component of an x-ray diagnostic generator which, as a consequence of the supply of the high voltage generator with medium frequency, can be made smaller and lighter in weight than would be the case with a comparable transformer fed with mains frequency. Due to the winding and cable capacitance transformed at the primary side, the high voltage transformer represents a capacitive load. A parallel resonant circuit can thus be formed for a fixed drive frequency by means of an inductance which matches this capacitive load. In the equivalent circuit, the inverse rectifier accordingly controls a parallel resonant circuit with its resonant frequency and with variable pulse duty factor. The resonant circuit energy, and thus the amplitude of oscillations, are varied by changing the pulse duty factor.

In an inverse rectifier of the type described above, two critical operating conditions must be considered for which the load represents a short-circuit for the inverse rectifier. These critical operating conditions are (1) cut-in moment, and (2) short circuit of the high voltage due, for example, to flashover in the x-ray tube.

SUMMARY OF THE INVENTION

It is an object of the present invention to provide an inverse rectifier which is permanently short-circuit-proof.

It is a further object of the present invention to provide an inverse recitifier having an extremely rapid current limitation rise, so that resultant damage in the high voltage circuit is avoided.

The above objects are inventively achieved in an inverse rectifier having respective air-core coils disposed between the load output of the rectifier and the switching transistors, and wherein the two junctions of the air-core coils with the switching transistors are cross-connected through diodes to the constant voltage source. The diodes are polarized so as block the constant voltage. The air-core coils thereby limit the steepness of the current in the short-circuit condition, and the coils are oppositely commutated by the diodes. A respective RC element may be connected in parallel with each of the air-core coils, so as to short any high frequency peaks which may appear under certain conditions.

DESCRIPTION OF THE DRAWING

The single FIGURE shows a schematic circuit diagram of an inverse rectifier constructed in accordance with the principles of the present invention and the principle connections thereto.

DESCRIPTION OF THE PREFERRED EMBODIMENTS

An inverse rectifier 1 constructed in accordance with the principles of the present invention is supplied from the mains through a mains element 2, which may include a power transformer and a rectifier. The load of the inverse rectifier 1 is formed by an x-ray generator 3 having a high voltage transformer with a primary winding to which the inverse rectifier 1 is connected The x-ray generator 3 comprises a parallel resonant circuit for the inverse rectifier 1. A high voltage regulator 4 functions for regulating the peak value of the high voltage by means of the pulse duty factor of the inverse rectifier 1. For this purpose, the high voltage regulator 4 includes a control circuit 5 for controlling the pulse duty factor 5 of two switching transistors 6 and 7 in the inverse rectifier 1. The switching transistors 6 and 7 are connected to a load output 8 through respective air-core coils 9 and 10. A second load output 11 is present at the common pole of two constant voltage sources. The two constant voltage sources are formed by two capacitors 12 and 13 which are charged by the mains element 2. The junctions of the air-core coils 9 and 10 with the load outputs of the switching transistors 6 and 7 are cross-connected to the constant voltage sources 12 and 13 through fast-response response diodes 14 and 15. The diodes 14 and 15 are polarized so as to block the constant voltage source present across the capacitors 12 and 13.

Alternating voltage at the load outputs 8 and 11 is generated by the switching transistor 6 and 7 which may, for example, be field effect transistors, by alternately switching the transistors to their low-impedance condition. Operation of the switching transistor 6 and 7 is undertaken by the control circuit 5. The inverse rectifier thus represents a half-bridge circuit which is formed by the capacitors 12 and 13 and the switching transistor 6 and 7. The steepness of the current in the short-circuit condition is limited by the air-core coils 9 and 10 which are oppositely commutated by the diodes 14 and 15. Respective RC elements 16 and 17, which short-circuit RF peaks which may occur under certain conditions, are connected in parallel with each of the air-core coils 9 and 10.

A signal proportional to the load current arrives at the high voltage regulator 4 through an anmeter coil 18 and a bridge rectifier 19. This signal is compared there to a reference signal. When the load current exceeds an adjustably selectable maximum value, the corresponding switching transistor 6 or 7 is switched off.

Every feed circuit for the inverse rectifier 1, formed by the switching transistor 6 and the capacitor 13 or, alternately, by the switching transistor 7 and the capacitor 12, has its own limiting inductance. Those inductances are not coupled to each other. These limiting inductances are located in the shunt circuits between the switching transistors 6 and 7. In the disruptive case, i.e., given simultaneous drive of both switching transistors 6 and 7, the limiting inductances prevent destruction of the transistors due to excessive current. Opposite commutation of the limiting inductances is undertaken by the diodes 14 and 15. The switching transistors 6 and 7 are thus protected and the functional reliability of the inverse rectifier 1 is increased, so that no impermissibly high inverse current can occur. The current-limiting inductances are in the form of air-core coils 9 and 10, so that core losses are eliminated and efficiency is improved over iron-core coils. In the x-ray generator shown in the drawing, the inductances are not predominantly loaded with a constant field, as is the case in normal switched power packs. The magnetic field is completely generated and dissipated in each period of operation. Extremely high losses which would otherwise arise in a coil with a limited core volume are thus avoided.

Although modifications and changes may be suggested by those skilled in the art it is the intention of the inventor to embody within the patent warranted hereon all changes and modificatons as reasonably and properly come within the scope of his contribution to the art.

I claim as my invention:

1. An inverse rectifier for use with a high voltage transformer of an x-ray generator comprising:

two switching transistors connected to a common load output;

a constant voltage source having a positive pole and a negative pole, said constant voltage source being connected to said load output through said two switching transistors for alternately connecting said positive and negative poles of said constant voltage source to said load output;

two air-core coils respectively connected between said load output and said switching transistors at respective junctions; and two diodes cross-connected between said junctions and said constant voltage source, said diodes being respectively polarized so as to block the voltage from said constant voltage source.

2. An inverse rectifier as claimed in claim 1, further comprising two RC elements each formed by a resistor and a capacitor connected in series, said RC elements being respectively connected in parallel with each air-core coil.

* * * * *